United States Patent

Hodge

[15] 3,699,246

[45] Oct. 17, 1972

[54] DROPOUT COMPENSATOR HAVING A SELF-BALANCING SWITCH

[72] Inventor: Frederick J. Hodge, Camarillo, Calif.

[73] Assignee: Minnesota Mining and Manufacturing Company, St. Paul, Minn.

[22] Filed: Feb. 16, 1970

[21] Appl. No.: 11,425

[52] U.S. Cl. ........178/6.6 DO, 178/6.6 HS, 307/243, 307/251

[51] Int. Cl. ..........................H04n 5/21, H04n 5/78

[58] Field of Search ........178/6.6 A, 6.6 HS, 6.6 DO; 307/243, 251

[56] References Cited

UNITED STATES PATENTS

| | | | |
|---|---|---|---|
| 3,328,521 | 6/1967 | Moskovitz | 178/6.6 DO |
| 3,502,905 | 3/1970 | Bicking | 307/243 |

*Primary Examiner*—Howard W. Britton
*Attorney*—Smyth, Roston & Pavitt

[57] ABSTRACT

The present invention is directed to an improved dropout compensator having a self-balancing video switch that provides an output signal having substantially a constant average voltage level. The self-balancing video switch is coupled to receive a direct video signal provided by a demodulator and normally conducts the direct video signal as the dropout compensator output signal. When a dropout is detected by a dropout detector, the dropout detector applies gate signals to the self-balancing video switch. When the self-balancing video switch receives the gate signals, the switch terminates conducting the direct video signal and initiates conducting a delayed video signal as the dropout compensator output signal. The self-balancing video switch includes a balancing circuit that maintains the switch output signal at a substantially constant average voltage level when switching between the direct and the delayed video signal.

16 Claims, 2 Drawing Figures

INVENTOR:
Frederick J. Hodge
By Smyth, Roston & Pavitt
ATTORNEYS

DROPOUT COMPENSATOR HAVING A SELF-BALANCING SWITCH

BACKGROUND OF THE INVENTION

1. Field of the Invention

This invention relates in general to a dropout compensator and more particularly to an improved dropout compensator having a self-balancing switch that provides an output signal having substantially a constant average voltage level.

2. Description of the Prior Art

In the reproduction of television video signals, dropouts can occur. A dropout is a momentary loss of signal. Dropouts can occur for many reasons. For example, a dropout may occur when reproducing a television signal that has been recorded on magnetic tape. When a dropout occurs, a disturbance may appear in the video picture in the form of streaks or flashes.

Since the information of a television video signal is substantially redundant from line to line, dropout compensators have been used that store or delay one or more lines of the video signal and substitute the delayed video signal for the video signal lost due to dropouts.

Prior art dropout compensators monitor the video signal with a dropout detector, and when a dropout is detected by the dropout detector, the dropout detector provides a control pulse to a video switch. When the control pulse is being received by the video switch, the video switch provides a delayed video signal from a previous line or lines which is applied to the video switch by a delay channel. When there are no dropouts, no control pulse is received by the video switch and the video switch passes a direct video signal.

Prior art systems which generally operate on the above principles are disclosed in U.S. Pat. No. 3,347,984, issued Oct. 17, 1967, in the name of Berten A. Holmberg and assigned to Minnesota Mining and Manufacturing Company; in U.S. Pat. No. 3,328,521, issued June 27, 1967, in the name of Irving Moskovitz and assigned to Minnesota Mining and Manufacturing Company; in U.S. Pat. No. 3,461,230, issued Aug. 12, 1969, in the names of Frederick J. Hodge and Ralph R. Barclay, and assigned to Minnesota Mining and Manufacturing Company; and in U.S. Pat. No. 3,463,874, issued Aug. 26, 1969, in the names of Frederick J. Hodge and Ralph R. Barclay, and assigned to Minnesota Mining and Manufacturing Company.

Since the video switch selectively conducts one of two received input signals, the direct video signal and the delayed video signal, as an output signal, it is desirable to maintain the output signal from the video switch at the same average voltage level irrespective of which of its received signals is being conducted. Prior art dropout compensators have used diode quads and transistor circuits as a video switch.

The diode quads used in the prior art include a diode bridge including a plurality of diodes that has a first voltage and a second voltage coupled across the diode bridge so that the first voltage is coupled to the anodes and the second voltage is coupled to the cathodes of the diodes. An input signal such as the video signal is applied to the bridge between the applied voltages. When it is desired to conduct the input signal to an output, the first voltage is positive and the second voltage is negative so that the diodes are forward biased. When it is desired to terminate the conducting of the input signal, the first voltage goes negative and the second voltage goes positive, which reverse biases the diodes.

When diode quads are used as the video switch, the output signal is dependent upon the applied voltages, and if the applied voltages vary in amplitude, the output signal will vary accordingly. Consequently, to maintain an output signal with a constant average voltage level with respect to the input signal, the applied voltages must be varied or adjusted in accordance with any changes in the average value of the input signal.

Furthermore, if it is desired to conduct one of two input signals, such as the direct video signal and the delayed video signal, as an output signal, a diode quad is needed for each input signal and the outputs must be tied together. Consequently, the voltages applied to each diode quad must be accurately preset, and if either of the input signals changes in average value, the voltage applied to the corresponding diode quad must be reset accordingly.

The transistor circuits used in the prior art have an output signal that has an average voltage level controlled by a dc voltage divider wherein the dc voltage divider has a variable potentiometer coupled to a constant voltage source. The constant voltage must be preset and then manually adjusted for input signal changes in average value to maintain an output signal at the same average voltage level as an input signal. Applicant knows of no prior art dropout compensator having a video switch that selectively provides an output signal having an average value related to the average value of a direct video signal and a delayed video signal.

SUMMARY OF THE INVENTION

The present invention provides a self-balancing video switch for use in a dropout compensator that selectively conducts either a direct video signal or a delayed video signal as an output signal wherein the output signal has substantially a constant average value irrespective of which input signal is being conducted. The self-balancing switch includes a first gate circuit coupled to receive the direct video signal and a first gate signal for conducting the direct video signal when the first gate signal is at a first voltage level. A balancing circuit is coupled to receive the direct video signal conducted by the first gate circuit and the delayed video signal for selectively conducting the received signals so that the conducted signals will have substantially a constant average value. A second gate circuit is coupled to receive the direct video signal conducted by the balancing circuit and a second gate signal for providing an output signal corresponding to the direct video signal, when the second gate signal is at a first voltage level. A third gate is coupled to receive the delayed input signal conducted by the balancing circuit and a third gate signal for providing an output signal corresponding to the delayed input signal when the third gate signal is at a second voltage level.

The above objects, features and advantages of the present invention will become apparent with reference to the following detailed description, taken in conjunction with the accompanying drawings, in which:

DESCRIPTION OF THE PREFERRED EMBODIMENT

Figure 1:
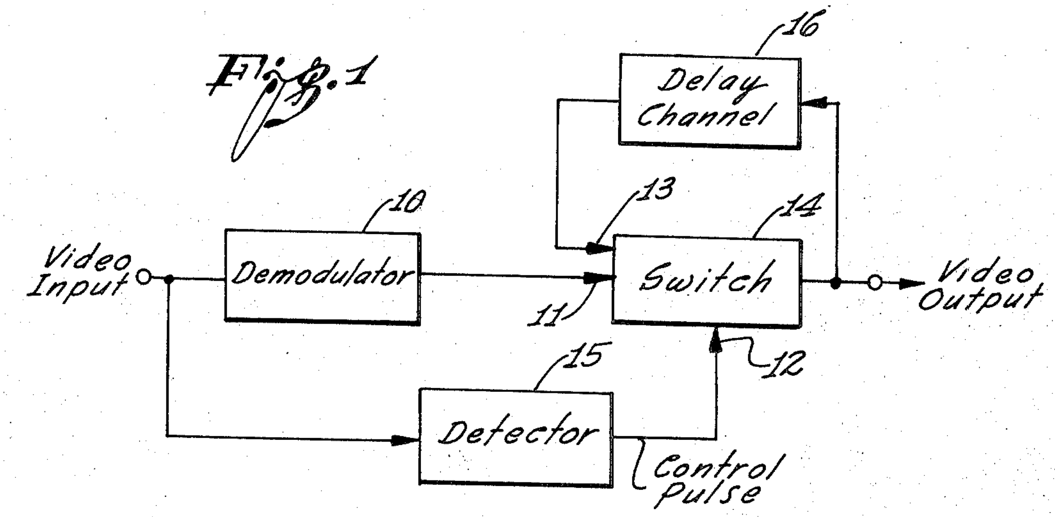
FIG. 1 is a block diagram of a typical dropout compensator.

Referring now to the drawing wherein like reference characters designate like or corresponding parts, there is shown in FIG. 1 a block diagram of a typical dropout compensator. The dropout compensator illustrated in FIG. 1 is of the type that specifically detects dropouts as represented by abrupt and substantial changes in the amplitude of a video input signal.

A demodulator 10 is coupled to receive the video input signal for providing a demodulated or direct video signal to a first input 11 of a switch 14. A detector 15 is coupled to receive the video input signal for providing a control pulse to a second input 12 of the switch 14. When no control pulse is applied to the switch 14 by the detector 15, the direct video signal provided by the demodulator 10 is conducted by the switch 14 as a video output signal. A delay channel 16 is coupled to receive the video output signal of the switch 14 for providing a delayed video signal to a third input 13 of the switch 14. The delay channel 16 can be a delay channel that delays the video output signal one scan line time. When the detector 14 provides a control pulse, the switch 14 changes state such that the delayed video signal is conducted by the switch 14 as the video output signal.

The switch 14, in a normally conducting state, conducts the direct video signal provided by the demodulator 10. However, when the input video signal drops below a particular signal amplitude level, the detector 14 detects the decrease in amplitude and provides the control pulse to the switch 14. When the switch 14 receives the control pulse, the switch 14 changes state so that it stops conducting the direct video signal provided by the demodulator 10 and conducts the delayed video signal provided by the delay channel 16.

Figure 2:
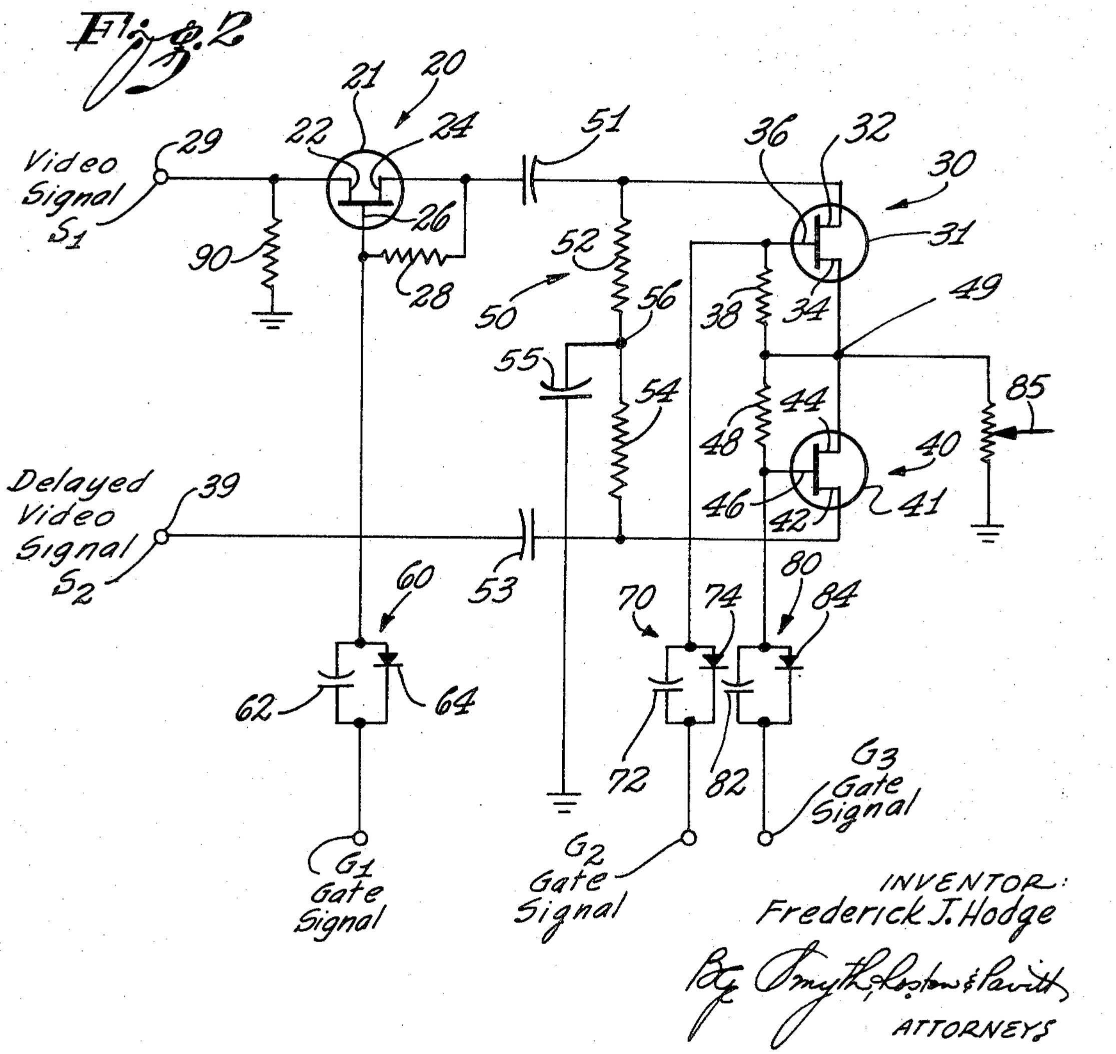
FIG. 2 is a schematic diagram of a self-balancing switch that can be used in a dropout compensator.

Referring now to FIG. 2, there is shown a schematic drawing of a self-balancing switch that can be used for the switch 14 illustrated in FIG. 1. The self-balancing switch includes a first gate circuit 20, a second gate circuit 30, a third gate circuit 40, a balancing circuit 50, a first input circuit 60, a second input circuit 70 and a third input circuit 80.

The first gate circuit 20 includes a field-effect transistor 21 and a resistor 28. The transistor 21 has a drain 22, a source 24, and a gate 26. The drain 22 of the transistor 21 is coupled to a first input terminal 29 to receive the direct video signal. The gate 26 of the transistor 21 is coupled to the first input circuit 60 to receive a first gate signal $G_1$ from the detector 15 in FIG. 1. The gate signal $G_1$ may be positive during all periods other than a dropout and may be negative during a dropout. The resistor 28 is a gate return resistor that is coupled between the source 24 and the gate 26 of the transistor 21. A terminating or impedance matching resistor 90 is coupled from the drain 22 of the first transistor 21 to ground potential to match the input impedance of the self-balancing switch to the input signal.

The transistor 21 illustrated in the drawing is a field-effect transistor having an n-type gate region. When an n-type gate region field-effect transistor is used, if there is no input to the gate 26 of the transistor 21 or if the first gate signal $G_1$ is positive with respect to the drain 22 of the first transistor 21, the direct video signal $S_1$ will be conducted from the drain 22 to the source 24 of the transistor 21. However, if the first gate signal $G_1$ is negative with respect to the direct video signal $S_1$, the resistance between the drain 22 to the source 24 will increase such that the transistor 21 will be turned off and no signal will be conducted from the drain 22 to the source 24 of the transistor 21.

The second gate circuit 30 includes a field-effect transistor 31 and a resistor 38. The transistor 31 has a drain 32, a source 34, and a gate 36. The drain 32 of the transistor 31 is coupled to receive the direct video signal $S_1$ conducted by the first gate circuit 20. The gate 36 of the transistor 31 is coupled to the second input circuit 70 to receive a second gate signal $G_2$ from the detector 15 in FIG. 1. The gate signal $G_2$ may be positive for all periods of time other than dropout and may be negative during a dropout. A resistor 38 is a gate return resistor that is coupled between the source 34 and the gate 36 of the second transistor 31.

The transistor 31 illustrated in the drawing is a field-effect transistor having an n-type gate region. When an n-type gate region field-effect transistor is used, if there is no input signal to the gate 36 of the transistor 31 or if the second gate signal $G_2$ is positive with respect to the drain 32 of the transistor 31, the direct video signal $S_1$ conducted by the first gate circuit 20 will be conducted from the drain 32 to the source 34 of the second transistor 31. However, if the second gate $G_2$ is negative with respect to direct video signal $S_1$, a resistance from the drain 32 to the source 34 will increase such that the transistor will be turned off and no signal will be conducted from the drain 32 to the source 34 by the transistor 31.

The third gate circuit 40 includes a field-effect transistor 41 and a resistor 48. The transistor 41 has a drain 42, a source 44, and a gate 46. The drain 42 of the transistor 41 is coupled to receive the delayed video signal $S_2$. The gate 46 is coupled to the third input circuit 80 to receive a third gate signal $G_3$ from the detector 15 in FIG. 1. The gate signal $G_3$ may be negative during all periods other than during dropout and may be positive during a dropout. The resistor 48 is a gate return resistor that is coupled between the gate 46 and the source 44 of the third transistor 41.

The transistor 41 can be a field-effect transistor having an n-type gate region. When an n-type gate region field-effect transistor is used if there is no input to the gate 46 of the transistor 41 or if the third gate signal $G_3$ is positive with respect to the drain 42 of the third transistor, the delayed video signal $S_2$ will be conducted from the drain 42 to the source 44 of the second transistor 41. However, if the third gate signal $G_3$ is negative with respect to the delayed video signal $S_2$, a resistance from the drain 42 to the source 44 will increase such that the transistor 41 will be turned off and no signal will be conducted from the drain 42 to the source 44 of the transistor 41.

The source 34 of the second transistor 31 and the source 44 of the third transistor 41 are coupled together by a common output terminal 49 so that, if either the direct video signal $S_1$ is conducted by the second transistor 31 or the delayed video signal $S_2$ is conducted by the third transistor 41, the conductor signals will be provided at a common output terminal 49. However, it should be understood that only one of the input signals will be provided as an output signal at any particular instant of time.

The balancing circuit 50 includes a capacitor 51, a capacitor 53, a capacitor 55, a resistor 52, and a resistor 54. The balancing circuit 50 operates to maintain the drain 32 of the second transistor 31 and the drain 42 of the third transistor 41 a substantially a constant average value when the output signal is switched between the input signals. The capacitor 51 is coupled between the source 24 of the first transistor 21 and the drain 32 of the second transistor 31. The capacitor 53 is coupled between a second input terminal 39, to receive the delayed video signal $S_2$ and the drain 42 of the transistor 41. The resistor 52 and the resistor 54 are connected in a series circuit relationship to form a voltage divider. The resistor 52 is coupled between the drain 32 of the second transistor 31 and a tie point 56. The resistor 54 is coupled between the drain 42 of the third transistor 41 and the tie point 56. The capacitor 55 is coupled between the tie point 56 and ground potential.

It should be noted that a potentiometer 85 is the only component of the system that is coupled to DC ground potential, which prevents ground loops from altering the potentials established by the balancing circuit 50.

The capacitor 51 and the resistor 52 form an RC circuit that has a time constant sufficient to maintain a constant voltage level at the drain 32 of the second transistor 31. Because of this, when switching the second transistor 31 off and the third transistor 41 on, the voltage of the drain 32 will remain substantially constant until the second transistor 31 is turned on again and the third transistor 41 is turned off. Furthermore, the capacitor 51, the resistor 52, and the capacitor 55 form a pie network that has a corner frequency with a particular exponential damping factor that is balanced with the corner frequency of the pie network, including the capacitor 53, the resistor 54, and the capacitor 55. Consequently, the two circuits are critically damped so that the voltage at the drain 32 of the second transistor 31 and the voltage of the drain 42 of the third transistor 41 follow each other with particular changes in voltage. For example, if a bounce-step function change occurs when switching the second transistor 31 off and the third transistor 41 on, a current surge is developed at the drain 32 of the second transistor 31 that passes through the resistor 52 and the capacitor 55 to ground and also passes through the resistor 54 and charges the capacitor 53.

The input circuits 60, 70 and 80 include a capacitor 62, a capacitor 72, a capacitor 82, a diode 64, a diode 74, and a diode 84, respectively. The capacitors 62, 72 and 82 are coupled in parallel circuit relationship with the diodes 64, 74 and 84, respectively. The input circuits 60, 70 and 80 are coupled to receive the first gate signal $G_1$, the second gate signal $G_2$, and the third gate signal $G_3$, respectively, for conducting the received gate signal when the gate signals $G_1$, $G_2$ and $G_3$ are at a particular voltage level.

The diodes 64, 74 and 84 couple the gate signals $G_1$, $G_2$ and $G_3$ to the drains 26, 27 and 28, respectively. When a particular gate signal is more positive than the average voltage value of either the direct video signal $S_1$ or the delayed video signal $S_2$, the diodes will be reverse-biased or cut off. When a particular gate signal is more negative than either the direct video signal $S_1$, or the delayed video signal $S_2$, the diode will be forward biased and the corresponding gate signal will be applied to the particular gate.

For example, if the first gate signal $G_1$ and the second gate signal $G_2$ are more positive than the average value of the direct video signal $S_1$, the diode 64 and the diode 74 will be reverse-biased and completely disconnect the first gate signal $G_1$ and the second gate signal $G_2$ from the gate 26 and the gate 36, respectively.

However, if the first gate signal $G_1$ and the second gate signal $G_2$ are more negative than the average value of the direct video signal $S_1$, the diodes 64 and 74 will be forward-biased and the corresponding gate signal will be applied to the gate 26 and the gate 36.

When the third gate signal $G_3$ is more positive than the average value of the delayed video signal $S_2$, the diode 84 will be reverse-biased and completely disconnect the third gate signal $G_3$ from the gate 46. When the third gate signal $G_3$ is more negative than the average value of the delayed video signal $S_2$, the diode 84 will be forward-biased and the third gate signal will be applied to gate 46.

The diodes 64, 74 and 84 operate to provide immunity to the transistors 21, 31 and 41 from differential gain by disconnecting the gate signals $G_1$, $G_2$ and $G_3$ from the transistors 21, 31 and 41. Field-effect transistors have finite capacitance in the gate that changes as the applied voltage changes. Consequently, if the driving force did not completely disconnect from the gate of the transistor "cob" (collector base open) modulation can occur which can cause a change in the gain due to variations in the gate capacitance. However, if the gate signals $G_1$, $G_2$ and $G_3$ are sufficiently positive when the 64, 74 and 84 diodes are reverse-biased, the diodes 64, 74 and 84 will completely disconnect the gate signals $G_1$, $G_2$ and $G_3$ from the gates 26, 36 and 46 and provide immunity to the transistors 21, 31 and 41 from the differential gain.

The capacitors 62, 72 and 82, coupled in parallel circuit relationship with the diodes 64, 74 and 84 operate to discharge any electrostatic charge that may be on the gates 26, 36 and 46 when the transistors 21, 31 and 41 are turned on.

Because of the capacity of the gate of a field-effect transistor, an electrostatic charge can build up on the gate. If the electrostatic charge is not eliminated, the transistor may turn on gradually instead of instantaneously when a gate signal is applied to the gate. The capacitors 62, 72 and 82 provide a voltage spike of short duration when the diodes 64, 74 and 84 are initially reverse-biased, which shorts out the diodes 64, 74 and 84 and momentarily allow any electrostatic charge on the gates 26, 36 and 46 to discharge.

Referring now to the operation of the self-balancing switch, the direct video signal $S_1$ is a repetitious input signal. The delayed video signal $S_2$ is a repetitious input signal having a repetition rate related to the repetition rate of the first input signal. For example, the direct video signal $S_1$ could be a television video signal and the delayed video signal $S_2$ could be the television video signal delayed by one repetition or one scan line time. Also, the direct video signal $S_1$ and the delayed video signal $S_2$ have substantially the same average voltage level.

Operationally, if it is assumed that the self-balancing switch normally conducts the direct video signal $S_1$ as an output signal and conducts the delayed video signal $S_2$ at times when there is an error or degradation in the direct video signal $S_1$, the first transistor 21 and the second transistor 31 are normally on or conducting and the third transistor 41 is normally off or is not conducting. Consequently, the first gate signal $G_1$ and the second gate signal $G_2$ will have an amplitude that is substantially more positive than the average value of the direct input signal $S_1$ and the third gate signal $G_3$ will have an amplitude that is substantially more negative than the average value at the delayed video signal. Therefore, the diode 64 and the diode 74 are reverse-biased and the first gate signal $G_1$ and the second gate signal $G_2$ are respectively decoupled from the gate 26 of the first transistor 31 and the gate 36 of the second transistor 32 so that the direct video signal $S_1$ is conducted from the drain 22 to the source 24 of the first transistor 21 through capacitor 51 and conducted from the drain 32 to the source 34 of the second transistor 31 to the output terminal 49. The first transistor 21 is decoupled from the circuit during the occurrence of dropout to prevent the average value of the voltage at the terminal 56 from becoming unsettled by the low level of the signal S, during a dropout.

The gate signal $G_3$ is negative with respect to the average value of the delayed video signal $S_2$, and forward-biased the diode 84 to apply the third gate signal $G_3$ to the gate 46 of the third transistor 41, turning the transistor 41 off or not conducting.

When it is desired to terminate conducting the direct video signal $S_1$ as an output signal and initiate the conduction of the delayed video signal $S_2$ as an output signal, the first gate signal $G_1$ and the second gate signal $G_2$ go negative with respect to the average value of the direct video signal $S_1$ and the third gate signal $G_3$ goes positive with respect to the average value of the delayed video signal $S_2$. When the first gate signal $G_1$ and the second gate signal $G_2$ go negative with respect to the average value of the direct video signal $S_1$, the diodes 64 and 74 are forward-biased and the first gate signal $G_1$, and the second gate signal $G_2$ are applied to the first transistor 31 and the second transistor 32, respectively, which turns the transistors 31 and 32 off or to a non-conducted state and the direct video signal $S_1$ will not be conducted to the output terminal 49. Simultaneously with the first gate signal $G_1$ and the second gate signal $G_2$ going negative, the third gate signal $G_3$ goes positive, which reverse-biases the diode 84 and disconnects the third gate signal $G_3$ from the gate 46, turning the third transistor 41 on to conduct the delayed input signal $S_2$ to the output terminal 49.

When the direct input signal $S_1$ returns to the desired average voltage level, the gate signals $G_1$ and $G_2$ return to a positive level with respect to the average value of the direct video signal $S_1$ and the gate signal $G_3$ returns to a negative level with respect to the average value of the delayed video signal $S_2$ which turns the transistors 31 and 41 on and the transistor 41 off and the direct video signal $S_1$ will be conducted at the output terminal 49.

When the direct video signal $S_1$ is being conducted to the output terminal, the capacitor 51 develops a charge such that, during the interval of time that the delayed video signal $S_2$ is subsequently being conducted to the output terminal 49, the time constant of the capacitor 51 and the resistor 52 will maintain the drain 32 and the drain 42 at a constant voltage level and hence the delayed video signal $S_2$ at the same average value as the direct video signal $S_1$. Similarly during the time that the delayed video signal $S_2$ is being conducted to the output terminal 49, the resultant flow of current will develop in the capacitor 53 a charge which causes a particular voltage to be produced at the terminal 56. This voltage will subsequently maintain the drain 42 at the particular level when the signal $S_1$ passes again to the output terminal 49.

While the salient features have been illustrated and described with respect to a particular embodiment of the present invention, it should be readily apparent that modifications can be made within the spirit and scope of the invention.

I claim:

1. In a dropout compensator wherein a delayed video signal is used in place of a direct video signal when a dropout occurs,
   - first means for providing the direct video signal,
   - second means responsive to the direct video signal for providing the delayed video signal a particular time after the direct video signal,
   - third means responsive to the direct video signal for providing signals having first amplitude characteristics indicating the occurrence of dropouts in the direct video signal, and having second amplitude characteristics when no dropout occurs in the direct video signal, and
   - self-balancing switching means responsive to the signals provided by the third means for normally passing the direct video signal at a particular average value dependent upon the average values of the direct and delayed video signals and for passing the delayed video signal at the particular average value during each occurrence of a dropout,
   - the self-balancing switching means including means for passing the direct video signal or the delayed video signal at a particular value independent of any variations in the amplitude of the signals from the third means during the production of the first amplitude characteristics or the second amplitude characteristics in the signals from the third means.
2. In the dropout compensator of claim 1,
   - the self-balancing switching means including a first charging circuit including a particular terminal and a second changing circuit including the particular terminal, the first charging circuit being operatively coupled to the first and third means to become charged to an average value at the particular terminal by the direct video signal during the periods between the occurrence of a dropout and regard less of any changes in the amplitude characteristics of the signal from the third means during such periods and the second charging circuit being operatively coupled to the second and third means to become charged at the particular terminal to an average value by the delayed video signal during the periods of the dropout and regardless of any changes in the amplitude characteristics of the signal from the third means during such periods.

3. In the dropout compensator set forth in claim 1, the switching means including first and second field effect transistors each having drains, gates and sources and each having the drains connected to receive a particular one of the direct and delayed video signals and each having gates connected to receive a particular one of the first and second control voltages and each having a common source.

4. In the dropout compensator of claim 1, means for introducing to the switching means a voltage balanced by the average value of the particular one of the direct and delayed video signals passing through the switching means to provide a balance during the operation of the switching means.

5. In a dropout compensator wherein a delayed video signal is used in place of a direct video signal when a dropout occurs, first means for providing the direct video signal, second means responsive to the direct video signal for providing a first control signal during the periods between the occurrence of dropouts and for providing a second control signal during the occurrence of dropouts, third means responsive to the direct video signal for delaying the direct video signal by a particular time interval, first and second charging circuits having a particular terminal and connected in a balanced relationship relative to the particular terminal respectively to receive the direct video signal and the delayed video signal and to provide at the particular terminal a potential related to the average values of the direct video signal and the delayed video signal, and switching means operatively coupled to the first, second and third means and the first and second charging circuits for passing, at a voltage level related to the voltage level of the particular terminal, and independent of any changes in the amplitude characteristics of the first control signal or the second control signal, the direct video signal during the periods between the occurrences of dropouts and the delayed video signal during the occurrence of dropouts.

6. In the dropout compensator set forth in claim 5, each of the first and second charging circuits including a resistance and a capacitance.

7. In the dropout compensator set forth in claim 5, the switching means including first and second field effect transistors each having drains, gates and sources and each having the drains connected to receive a particular one of the direct and delayed video signals and each having gates connected to receive a particular one of the first and second control voltages and each having a common source.

8. In the dropout compensator set forth in claim 7, each of the first and second charging circuits including a resistance and capacitance in series and including a common connection between the resistances in the charging circuits and including a common connection between the drain of each field effect transistor and the terminal common to the resistor and the capacitor in the associated charging circuits.

9. In a dropout compensator wherein a delayed video signal is used in place of a direct video signal when a dropout occurs, first means for providing the direct video signal, second means responsive to the direct video signal for providing a first control signal during the periods between the occurrence of dropouts and for providing a second control signal during the occurrence of dropouts, third means responsive to the direct video signal for delaying the direct video signal by a particular time interval, first switching means operatively coupled to the first and second means for passing the direct video signal, upon the production of the first control signal by the second means, at a level independent of any changes in the amplitude characteristics of the first control signal, second switching means operatively coupled to the second and third means for passing the delayed video signal, upon the production of the second control signal by the second means, at a level independent of any changes in the amplitude characteristics of the second control signal, and self-balancing means responsive to the direct video signal and the delayed video signal for producing a particular voltage representing the average of the direct video signal and the delayed video signal, the self-balancing means being operatively coupled to the first and second switching means to provide for the passage of the direct video signal and the delayed video signal at a voltage level related to the particular voltage and independent of any changes in the amplitude characteristics of the first and second control signals.

10. In the dropout compensator set forth in claim 9, the self balancing means including a pair of charging circuits having a balanced electrical relationship to each other.

11. In the dropout compensator set forth in claim 10, each of the charging circuits including a resistance and a capacitance and having a common terminal.

12. In the dropout compensator set forth in claim 11, each of the first and second switching means including a field effect transistor having a drain connected to receive a particular one of the direct and delayed video signals and a gate connected to receive a particular one of the first and second control voltages.

13. In a system wherein first and second signals are provided and wherein a first control voltage is provided at first particular times to pass the first signal and wherein a second control voltage different from the first control voltage is provided at second times to pass the second signal, self-balancing means responsive to the first and second signals, the self-balancing means having a particular terminal for receiving a particular voltage, first switching means responsive to the first signal and the first control voltage and operatively coupled to the particular terminal for passing the first signal at a voltage related to the particular voltage, but independent of the first control voltage, during the occurrence of the first control voltage, and second switching means operatively coupled to the particular terminal in a balanced relationship to the operative coupling of the first switching means to the particular terminal, the second switching means being responsive to the second signal and the second control voltage for passing the second signal at the voltage related to the particular voltage, but independent of the second control voltage, during the occurrence of the second control voltage.

14. In the system set forth in claim 13, the self balancing means including first and second charging circuits connected in a balanced relationship to the particular terminal.

15. In the system set forth in claim 14, each of the first and second charging circuits including a resistance and a capacitance.

16. In the system set forth in claim 14, each of the first and second switching means including a field effect transistor having a drain connected to receive a particular one of the first and second signals and having a gate connected to receive a particular one of the first and second control voltages.

* * * * *